United States Patent Office 3,575,813
Patented Apr. 20, 1971

3,575,813
CONTINUOUS FERMENTATION APPARATUS
Willy Rothmayr, La Tour-de-Peilz, Switzerland, assignor to Societe d'Assistance Technique pour Produits Nestle S.A., Lausanne, Switzerland
Filed Nov. 29, 1967, Ser. No. 686,470
Claims priority, application Switzerland, Dec. 1, 1966, 17,187/66
Int. Cl. C12b 1/00
U.S. Cl. 195—139                                   4 Claims

ABSTRACT OF THE DISCLOSURE

A continuous method and apparatus for fermenting medium in thin layers on superposed plates in a column, pass air countercurrently and uniformly through the thin layers and means for varying the temperature of the thin layers of the medium.

---

The present invention relates to a fermenter, and more particularly to a continuous fermenter for the culture of micro-organisms in the liquid or solid phase on a large scale.

The fermentation or culture of aerobic micro-organisms on media in the liquid or semi-liquid phase is generally effected in tanks provided with devices for ensuring a continuous injection of air into the reaction medium and intense mechanical agitation. The rapid growth of aerobic micro-organisms is largely dependent on a good dispersion of air in the nutrient medium and it is known that, above a certain volume, the devices for mechanical agitation or mixing are not adequate to assure a homogeneous nutritive medium.

Moreover, the operation of the mechanical apparatus for producing the mechanical agitation of the reaction medium uses considerable energy and a large part of this energy merely results in a displacement of the medium in the tank rather than actual mixing and dispersal of the liquid and gaseous phases.

The present invention is able to improve the fermentation conditions while allowing an appreciable saving in energy.

According to the invention, a method of continuously fermenting a nutrient medium containing a micro-organism includes disposing the medium in at least one thin layer.

If the substrate is in the liquid phase, it is preferred to carry out the continuous fermentation with the reaction medium in relatively thin layers on plates mounted one above another in a column.

Preferably, aeration of the reaction medium is done by air under pressure uniformly distributed to each of the layers.

The invention also comprises a continuous fermenter for carrying out one embodiment of the above method. This apparatus comprises a hollow column, a plurality of nuperposed horizontal plates within said column disposed to support layers of said medium, said plates being arranged for the medium to flow from the upper surface of each plate to the upper surface of the next lower plate under gravity, conduit means for supplying said medium to the uppermost plate, conduit means for withdrawing said medium from the lowermost plate, and aereating means for blowing air through said plates, said aereating means being disposed to give a uniform distribution of air in the medium.

According to one preferred form of execution, the column is divided into several sections communicating with each other and each comprising a series of superposed plates.

The method of the invention is applicable to the fermentation or culturing of micro-organisms in liquid, semi-liquid and solid substrates.

It should be understood that the method and apparatus described herein are primarily intended for use with aerobic micro-organisms but they can also be used with non-aerobic micro-organisms.

When the substrate is in liquid form, the fermentation is advantageously effected on the superposed plates mounted inside the column. The reaction medium, spread over the plates in relatively thin layers, is strongly agitated by a current of air under low pressure which is hence uniformly distributed within the whole liquid layer. Thhe method allows not only an excellent contact between the liquid and gaseous phases but also a perfectly homogeneous supply of air to aerobic micro-organisms. While saving an appreciable amount of power the optimum conditions for fermentation or culture are obtained by virtue of a rational utilisation of air and nutritive elements.

According to one embodiment of the method, applicable to semi-liquid or solid substrates, the fermentation or culture can be effected continuously using at least one relatively thin layer on a fluidised bed, the latter being carried by a support in the form of a rectangular plane or a spiral mounted in a vertical enclosure.

The accompanying drawings show by way of example only, one type of fermenter for carrying out the method of the invention.

Figure 1:
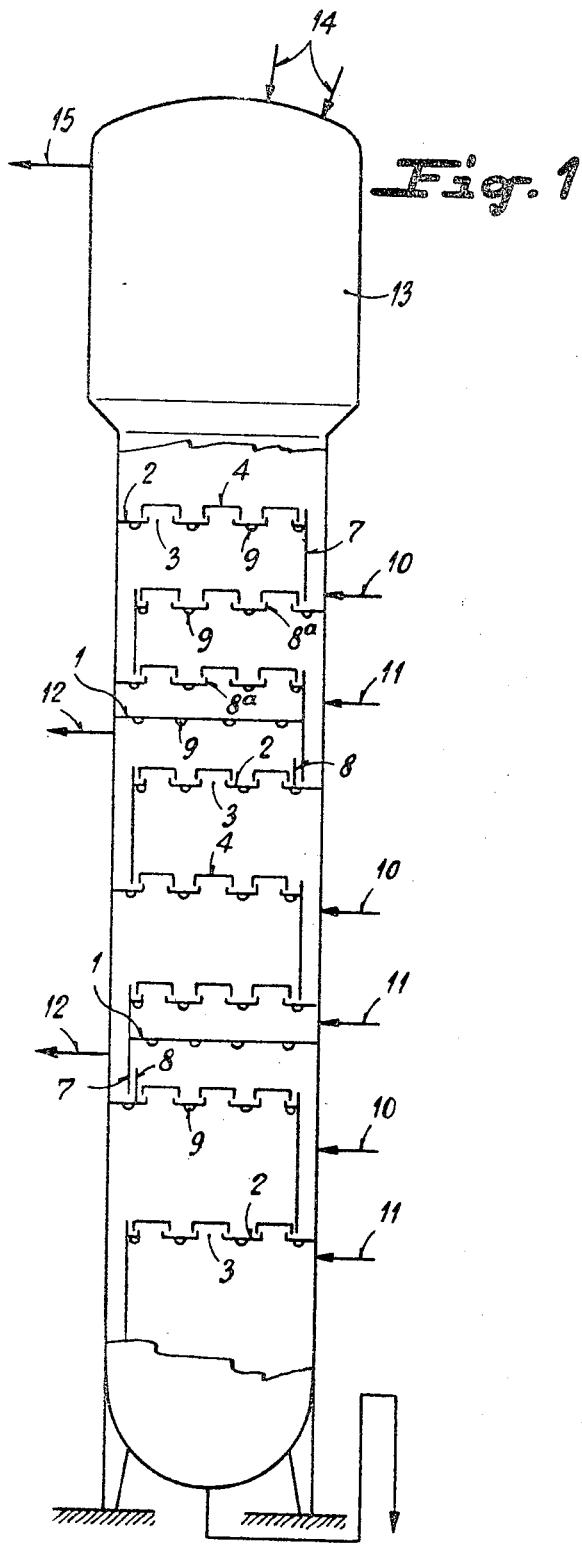
FIG. 1 is a schematic longitudinal elevation.

As shown in the drawings, the continuous fermenter consists of a column comprising in enlarged head and a body of which the bottom comprises a temporary reservoir for the fermentation product. The middle part of the column is divided by horizontal dividers 1 and is composed of several sections each comprising a series of plates 2, for example 3 to 12 plates in a series.

Figure 2:
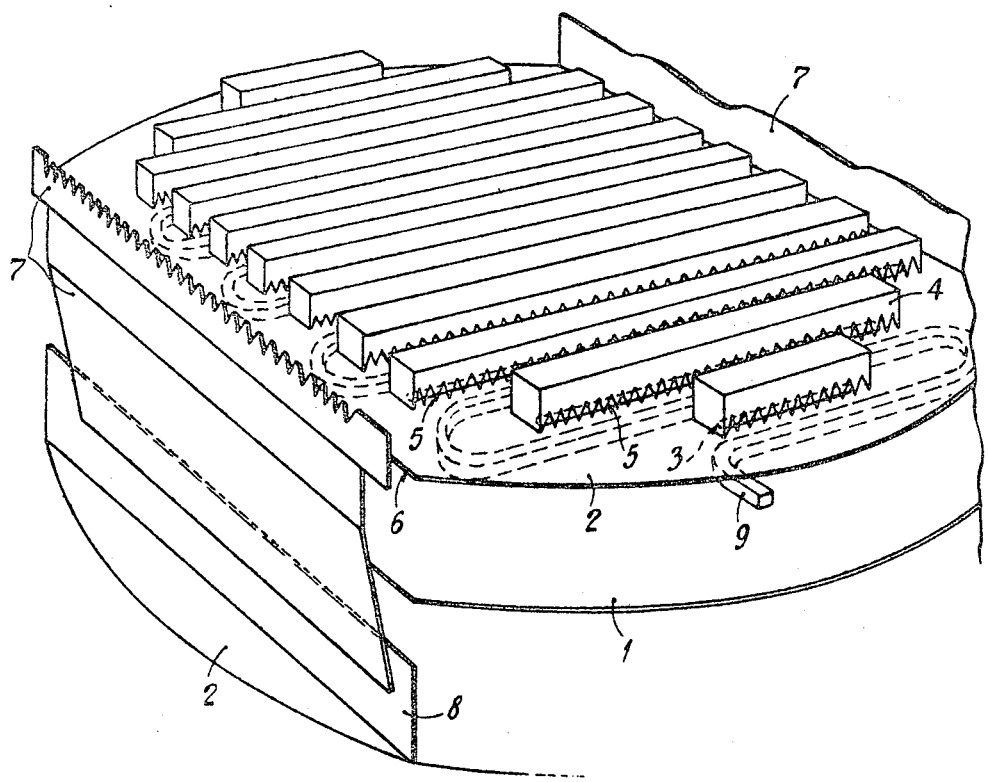
FIG. 2 is an enlarged perspective view of one of the plates on which fermentation is effected.

Each of the plates, as shown in FIG. 2, comprises a number of longitudinal openings 3 covering the whole surface of the plate. These openings, surrounded by edges 8a around the whole of their peripheries, are covered by channel-shaped covers 4 of which the lower longitudinal edges adjacent to the surfaces of the plates have indentations 5.

According to one alternative embodiment, the openings 3 can be circular, for example, and covered by caps of corresponding shape.

Each plate has also a rectilinear edge 6 perpendicular to the direction of displacement of the liquid phase at that point. The edges of the successive plates are arranged, as shown in FIG. 1, in alternating diametrically opposed positions along the column. A flange 7, which can be fixed or movable, is mounted along the edge 6 of each plate, the flange being lengthened towards the bottom and constituting a deflector of which the lower edge is situated at a predetermined distance, preferably adjustable, from the next plate. The plates also have, generally at the head of each section, deflectors 8 allowing adjustment of the rate of feed to the sections. The plates also have heating and cooling devices. According to the embodiment shown in the drawings, these devices comprise tubular elements 9 mounted on the lower surface of the plates for circulating refrigerating fluid, for example.

According to another embodiment (not shown in the drawing), the heating and refrigerating devices are positioned on the upper surfaces of the plates, these devices comprising for example channels through which said fluid can be circulated.

The casing of the column has preferably at the level of each section, a certain number of devices not shown in the drawings, such as means for observing the progress of the fermentation, measuring instruments for the temperature and pH of the fermenting medium etc., at least one inlet duct 10 for the constituents of the reaction medium, at least one inlet 11 and outlet 12 for air under pressure and devices for taking samples at different stages during the fermentation. The column can also be fitted with one or more access ports (not shown) for inspection and repairs.

The fermenter according to the invention includes an expansion chamber 13 which occupies the whole of the upper part of the column. The main supply ducts 14 lead into this chamber, supplying the substrate source of carbon (molasses, hydrocarbons, water, etc.) and materials containing the other nutritive elements required (nitrogen, potassium, phosphorus, vitamins, antibiotics, etc.). The chamber 13 also has an air outlet 15 and advantageously an inlet duct for an antifoaming agent which can be combined with a device for collecting and returning the excess foam produced during the fermentation.

The fermenter is preferably of the type which empties itself when the process is discontinued, this arrangement allowing easy cleaning and sterilisation of the column, which is generally done by means of a jet of steam.

The functioning of the fermenter described above with reference to the drawing is as follows:

The liquid substrate and the other materials comprising the reaction medium are introduced continuously into the fermenter by the ducts 14, which lead into the chamber 13 at the top of the column. The reaction medium is delivered to the plates 2 and travels slowly from one plate to the next throughout the height of the column; the depth of the liquid layer, which determines the residence time of the reaction medium on each plate, is regulated by the deflectors 7 and, to some extent, by the deflector 8.

The supply of air to each section is assured by one or more ducts 11. The air, supplied under a relatively low pressure is directed countercurrent to the flow of the reaction medium so that it rises through the series of plates in each section through the apertures 3 and the pressure is sufficient to hold the liquid phase on the plates. The current of air circulating under the covers 4 is fed uniformly into the liquid layer by virtue of the spaces of reduced size formed by the apertures 5; these produce not only an even air feed to the aerobic organisms but also produce, according to the invention, an energetic agitation, by bubbling of the reaction medium. A uniform constant dispersion of air in the liquid medium is thus obtained.

The fermentation or culture of the micro-organisms is generally exothermic. On the other hand, the optimum yield of micro-organisms is largely dependent on the ambient temperature. In order to absorb the excess heat, for example, and to maintain the layer of reaction medium at the optimum temperature for the reaction, the plates are cooled by circulation of a refrigerating fluid in the tubular elements 9.

During the treatment the composition of the reaction medium can be altered, for example enriched, by adding at a point between different sections an appropriate quantity of one or more constituents of the medium and, if necessary, an antifoaming agent. It is also possible, at a stage during the fermentation to inoculate new ferments obtained by culturing fresh stocks or by removal at another stage in the operation (recycling).

Also, the fermenter comprises devices at the same level as the sections for removing the reaction medium. Preferably, these devices can combine this function with that of feeding the materials to the medium, for example as the ducts 10.

I claim:

1. An apparatus for continuously fermenting a nutrient medium containing micro-organisms, which comprises a hollow column, a plurality of superposed horizontal plates disposed within said column and adapted to support thin layers of said medium, said plates being arranged for the medium to flow from the upper surface of each plate to the upper surface of the next lower plate under gravity, conduit means for supplying said medium to the uppermost plate, conduit means for withdrawing said medium from the lowermost plate, a source of air under pressure, means for introducing said air into said layers at locations over the whole surface of each of said plates and for uniformly distributing said air within said layers, and means operatively connected to said plates for varying the temperature of said layers of medium on said plates.

2. An apparatus as defined in claim 1, in which said column is divided into a plurality of sections communicating with each other and each section comprises a series of said plates.

3. An apparatus as defined in claim 1, in which the lower surfaces of the plates have tubular elements for circulating fluid for varying the temperature of the plates.

4. An apparatus as defined in claim 1, in which the upper surfaces of the plates have channels for circulating fluid for varying the temperature of the plates.

References Cited

UNITED STATES PATENTS

| | | | |
|---|---|---|---|
| 2,206,507 | 7/1940 | Kühni | 252—361 |
| 2,396,900 | 3/1946 | Taggart | 195—3(H)(UX) |
| 2,853,281 | 9/1958 | Hibshman et al. | 261—114 |
| 2,880,980 | 4/1959 | Bowles | 261—114 |
| 2,916,527 | 12/1959 | Adams et al. | 261—114 |
| 3,251,749 | 5/1966 | Lipps | 195—115X |
| 3,281,329 | 10/1966 | Lipps | 195—115X |

A. LOUIS MONACELL, Primary Examiner

G. M. NATH, Assistant Examiner

U.S. Cl. X.R.

195—109, 115, 141, 142